C. A. ELLIS.
VALVE.
APPLICATION FILED SEPT. 14, 1907.

957,318.

Patented May 10, 1910.

Witnesses:
P. B. Philipp
O. F. Kehoe

Inventor:
Clifford A. Ellis
by his Attys:
Philipp Sawyer Rice Kennedy

UNITED STATES PATENT OFFICE.

CLIFFORD A. ELLIS, OF BAYONNE, NEW JERSEY, ASSIGNOR TO STANDARD OIL COMPANY OF NEW YORK, A CORPORATION OF NEW YORK.

VALVE.

957,318.  Specification of Letters Patent.  Patented May 10, 1910.

Application filed September 14, 1907. Serial No. 392,861.

*To all whom it may concern:*

Be it known that I, CLIFFORD A. ELLIS, a citizen of the United States, residing at Bayonne, county of Hudson, and State of New Jersey, have invented certain new and useful Improvements in Valves, fully described and represented in the following specification and the accompanying drawings, forming a part of the same.

This invention relates to improvements in valves, and more particularly to that class of valves known as vacuum and pressure relief valves, and it has been especially designed for use in tanks and boilers and the like which have to be air tight. In such tank and boilers the withdrawal, sudden or otherwise, of their contents, causes a vacuum which unless relieved is apt to cause their collapse, and also the filling of the tank or boiler causes a pressure of the gas or steam therein which, unless relieved, is apt to result in the explosion of the tank or boiler. Furthermore, in oil and gasolene tanks, to which the invention is particularly applicable, any changes in temperature causes a rise or fall in the internal pressure of the tank, owing to the expansion or contraction of the gases from the oil or gasolene, which expansion or contraction must be compensated for.

My invention has for its object to provide a combined vacuum and pressure relief valve of improved construction which shall relieve a vacuum or excessive pressure in tanks or boilers.

It is a further object of my invention to provide such a valve which shall be simple in construction, which shall be durable, and which shall be automatic in its action.

It is a further object of the invention to provide a construction, all the moving parts of which shall be concealed and inclosed, so that said moving parts cannot be tampered with, this being especially desirable in the case of oil or gasolene tanks.

For a full understanding of the invention, a detailed description of the same will now be given in connection with the accompanying drawing, in which—

Figure 1:
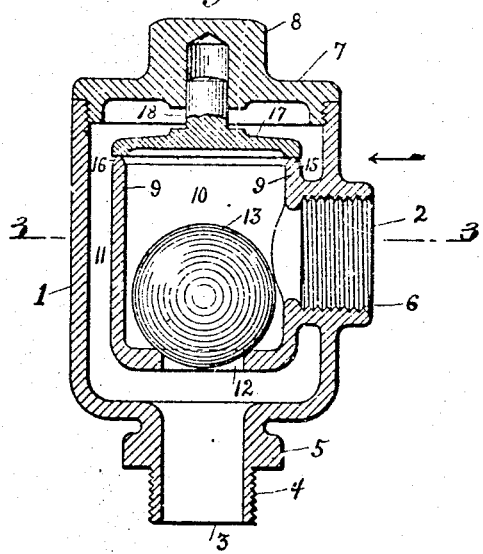
Figure 2:
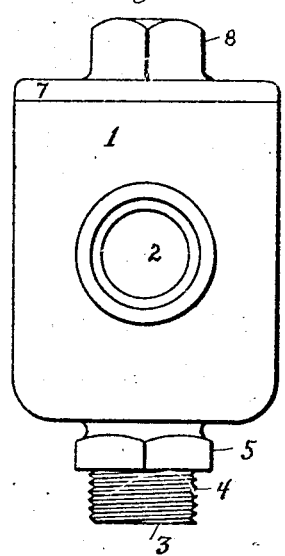
Figure 3:
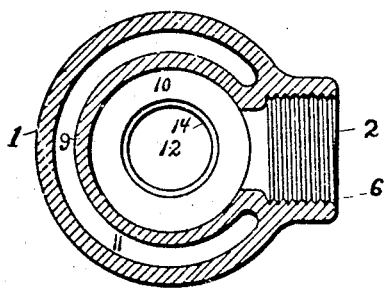
Figure 4:
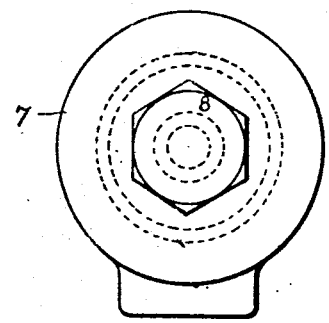

Figure 1 is a vertical section of my improved valve; Fig. 2 is a side view of the valve looking in the direction of the arrow, Fig. 1; Fig. 3 is a cross section taken on line 3—3, Fig. 1, and Fig. 4 is a top view.

Referring now to said drawing, the combined vacuum and pressure relief valve comprises an outer casing 1. This casing 1 may be of any desirable configuration, and composed of any suitable material. Preferably, it will be composed of composition brass, and will be circular, as shown, the valve being used in a vertical position. The casing 1 is provided with openings 2, 3, these openings forming the inlet and outlet openings to the valve. Either the opening 2 or the opening 3 may be the inlet opening. In the particular construction shown, the opening 3 is the opening leading from the tank (not shown) to which the valve is to be applied, and therefore the inlet to the valve. The casing is provided with an exteriorly threaded portion 4 which is screwed to the tank and forms an air tight joint, a portion of the casing 5 above the thread being in the form of a nut to enable the casing to be screwed to the tank. The opening 2, which in this instance forms the outlet from the valve, is interiorly threaded, as shown at 6, to receive the threaded end of a relief pipe (not shown) which leads to the outer air. The casing 1 is provided with a removable threaded cap-piece 7, having a part 8 forming a nut, by which the cap can be screwed to and unscrewed from the casing.

All the moving parts of the improved valve are preferably positioned as shown within the casing 1, so that the valve can be buried under ground, as is especially desirable when it is to be used in connection with oil or gasolene tanks, and so that the moving parts cannot be tampered with. This construction, furthermore, is very compact. The parts of the valve are assembled in the casing or removed therefrom when necessary through the opening formed by the removal of the cap piece.

As stated, the improved valve is a combined vacuum and pressure relief valve, that is to say, the valve has the functions both of relieving a vacuum or any excessive pressure in the receptacle with which it may be used, as each such condition may arise. To perform such functions, it is necessary that the moving parts of the valve be so constructed as to seat snugly, and, furthermore, so that the valve will operate surely and automatically. There are provided, therefore, for performing these functions, vertically operating gravity valves, one of which valves has the function of relieving a vacuum in the receptacle, and the other of which valves has the function of relieving any excess of pressure therein, these valves being so arranged that while one of them is in operating or open position, the other will remain in closed or non-operating position, and they are so constructed and arranged as to fit snugly and tightly in their seats and entirely close the openings controlled by them. The particular construction and disposition of these gravity valves may be somewhat varied. As preferred and shown there is provided a valve casing 9, this valve casing, in the construction shown, being positioned within the outer valve casing 1, and preferably formed integral therewith. This valve casing is hollow and is provided with an opening in direct communication with the outer air, and in the particular instance illustrated through an opening 2 of the outer casing 1. This valve casing 9, as shown, is open at its top or upper end, and is provided with an opening 12 at its bottom or lower end. The opening at the top and the opening 12 at the bottom are controlled by the vertically operating gravity vacuum and pressure valves which will now be described. Either valve may, if desired, be arranged to perform the functions of pressure valve or vacuum valve. In the present instance, the pressure valve controls the opening 12 and is in form preferably a ball 13, which ball is of the necessary size and weight to perform the functions for which it is intended. The inner bottom wall of the valve casing 9 is beveled, as shown at 14, to form a seat for the ball valve 13, the ball valve resting snugly on this seat and when seated fitting tightly and entirely closing the opening. The upper edge 15 of the valve casing 9 is beveled, as shown at 16, to form a seat for the valve 17, which, in this instance, acts as the vacuum valve. This valve is likewise a gravity valve, being in the construction shown a lift valve having a stem 18, which stem is adapted to work in a hole or slot formed in the cap piece 7 of the casing 1, this hole or slot forming a guide for the valve and preventing it slipping off of its seat sidewise. This valve 17, when in its closed position, seats snugly and entirely closes the opening.

In order that the valve may operate as a vacuum and pressure relief valve, means must be provided whereby outer air may be permitted to have ingress to the tank or receptacle with which the valve is used, and by which gases in the receptacle may have egress therefrom to the outer air. These means may be varied. In the particular construction shown, the valve casing 9 is so positioned within the outer casing 1 as to form a chamber 11, this chamber being located between the outside walls of the valve casing and the inside wall of the casing 1. This chamber 11 is, in the particular construction illustrated, in direct communication with the inlet opening 3 of the outer casing, and the openings controlled by the gravity valves 13, 17 open into this chamber 11, this construction providing a simple and efficient means whereby the vacuum and pressure in the receptacle on which the valve is used may be controlled.

The operation of the combined vacuum and pressure valve will be readily understood from the foregoing description, but may be briefly described as follows, when used in connection with an oil or gasolene tank: Assuming the valve to be in the position shown, namely, with the opening 3 leading to the tank with which the valve is to be used, and assuming the pressure in that tank to be X, the parts of the valve will be in the position shown. Now, if the contents of the tank are withdrawn, a vacuum will be formed, which vacuum must be relieved. As the contents are removed and a vacuum formed, air enters in through the opening 2, and raises the lift valve 17, passes through the chamber 11 and inlet 3 to the tank, and relieves the vacuum. As soon as the pressure in the tank rises to X, the valve 17 then reseats itself and the parts assume the position shown in Fig. 1. Now, assuming that the tank is empty, and that it is desired to fill the same, the valve will be in the position shown in Fig. 1. As soon as the liquid enters the tank, the air or gas therein is compressed and pressure created therein. The ball valve 13 is then lifted from its seat, and the excess gas passes out through the opening 2 to the relief pipe until the pressure in the tank is reduced to X, the pressure of the gas around the chamber 11, and the weight of the valve itself, holding the valve 17 firmly on its seat. The pressure valve 13 and the vacuum valve 17 are of dimensions proportioned to the vacuum and the pressure which they are intended to relieve, the weights of the valves being increased or diminished according to the vacuum or pressure it is desired to maintain in the tank.

While the valve has been described as particularly applicable for use with oil and gasolene tanks for relieving air or gas pressure, it will be understood that it can be used equally well with hot water and steam boilers, or with other closed receptacles where it is desirable to relieve liquid pressure, and the invention is not to be limited to such particular use. It is to be further understood that the invention is not limited to the specific construction shown and described, but that changes and variations may be made in the same without departing from the invention.

What is claimed is:—

1. In a valve of the character described, the combination of an outer casing having an outlet opening in direct communication with the outer air, and an inlet opening, a valve casing located in said outer casing in direct communication with said outlet opening, said valve casing being spaced from said outer casing so as to form an inclosed chamber, said valve casing being provided with openings in communication with said chamber, and vertically operating gravity valves closing said openings in the valve casing, one of said valves being arranged to open when the pressure in the chamber exceeds that in the valve casing and the other of said valves being arranged to open when the pressure in the valve casing exceeds that in the chamber, substantially as described.

2. In a valve of the character described, the combination of an outer casing having an outlet opening in direct communication with the outer air, and an inlet opening, a valve casing located in said outer casing in direct communication with said outlet opening, said valve casing being provided with openings and spaced from said outer casing to form an inclosed chamber in communication with the inlet opening of the outer casing and with the outlet opening of said casing through the openings in said valve casing, and vertically operating gravity valves closing said openings in the valve casing, one of said valves being arranged to open when the pressure in the chamber exceeds that in the valve casing and the other of said valves being arranged to open when the pressure in the valve casing exceeds that in the chamber, substantially as described.

3. In a valve of the character described, the combination of a valve casing in open communication with the outer air, an outer casing spaced therefrom to form an inclosed chamber, said valve casing being provided with openings in communication with said chamber, and vertically operating gravity valves closing said openings, one of said valves being arranged to open when the pressure in the chamber exceeds that in the casing, and the other of said valves being arranged to open when the pressure in the casing exceeds that in the chamber, substantially as described.

4. In a valve of the character described, the combination of an outer casing having an outlet opening in communication with the outer air, and an inlet opening, a valve casing located in said outer casing and in direct communication with the outlet of said outer casing, said valve casing being spaced from said outer casing to form an inclosed chamber in communication with the inlet opening of the outer casing, said valve casing being provided with openings in communication with said chamber, a gravity valve having its seat in the valve casing for closing one of said openings therein, said valve being arranged to open when the pressure in the chamber exceeds that in the valve casing, a second gravity valve for closing the other opening in said valve casing, said valve having its seat on the valve casing and closing said second opening, said valve being arranged to open when the pressure in the valve casing exceeds that in the chamber, substantially as described.

5. In a valve of the character described, the combination of a casing provided with inlet and outlet openings, a valve casing positioned in the outer casing in direct communication with one of said openings, a chamber formed between the valve casing and the outer casing in direct communication with the other of said openings, said valve casing being provided with openings in communication with said chamber, a lift valve having its seat on the valve casing for closing one of said openings, said lift valve being arranged to open when the pressure in the valve casing exceeds that in the chamber, and a ball valve having its seat in said valve casing for closing the other of said openings, said ball valve being arranged to open when the pressure in the chamber exceeds that in the casing, substantially as described.

6. In a valve of the character described, the combination of an outer casing having an opening in direct communication with the outer air, an inner valve casing integral with said outer casing and having an opening in its side in communication with the outer opening to the outer casing, said outer casing and said valve casing being spaced apart to form a chamber, said valve casing being provided with vertically opposed openings in its top and bottom in communication with the chamber, gravity valves closing said top and bottom openings in the valve casing, one of said valves being arranged to open when the pressure in the chamber exceeds that in the valve casing and the other of said valves being arranged to open when the pressure in the valve casing exceeds that in the chamber, substantially as described.

In testimony whereof, I have hereunto set my hand, in the presence of two subscribing witnesses.

CLIFFORD A. ELLIS.

Witnesses:
P. B. PHILIPP,
T. F. KEHOE.